Nov. 25, 1952    J. N. GRABER    2,619,166
INTERLOCKING CONNECTION BETWEEN A PULLEY
CARRIAGE AND A DRAPERY TRAVERSE ROD
Filed Dec. 2, 1950

Inventor
JOHN N. GRABER
By Wheeler, Wheeler & Wheeler
Attorneys

Patented Nov. 25, 1952

2,619,166

UNITED STATES PATENT OFFICE 2,619,166

INTERLOCKING CONNECTION BETWEEN A PULLEY CARRIAGE AND A DRAPERY TRAVERSE ROD

John N. Graber, Madison, Wis., assignor to The Graber Company, Middleton, Wis., a partnership Application December 2, 1950, Serial No. 198,773

10 Claims. (Cl. 160—344)

1

This invention relates to an interlocking connection between a pulley carriage and a drapery traverse rod.

The invention makes it unnecessary to use tools for connecting a pulley carriage to, or locating it in, the end of a traverse rod, the carriage being so made as to automatically position itself at the end of the rod, and frictionally or mechanically to retain its position until released. In achieving these objectives, the carriage is desirably made of spring stock biased toward detent engagement with the rod and provided with a handle by which the bias can be overcome to permit manipulation of the carriage respecting the rod. The rod is desirably notched to receive portions of the carriage to effect a positive detent engagement, but the notching of the rod is not essential, since frictional detent action is effective regardless of the provision of the notch.

Figure 1:
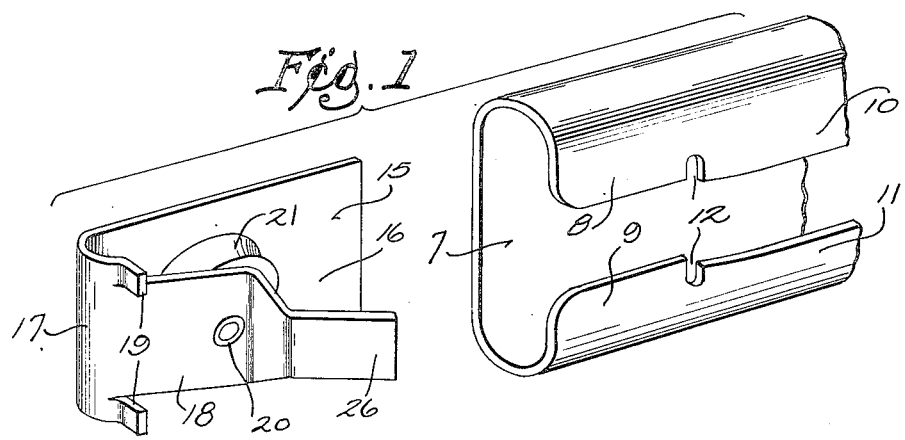
Fig. 1 shows in perspective the separated pulley carriage and the end of a traverse rod.
Figures 2, 3:
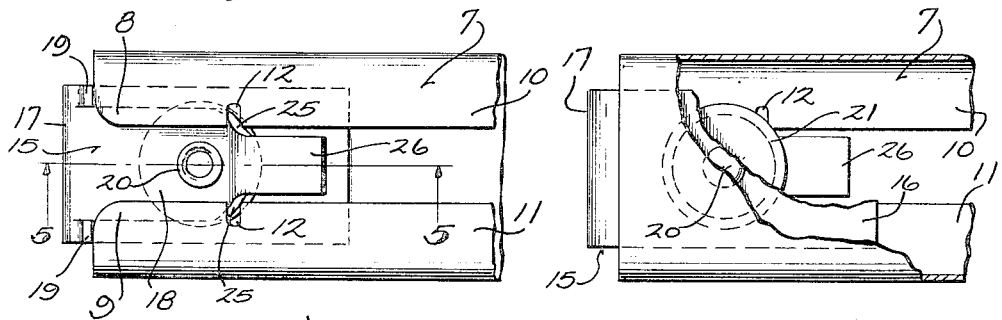
Fig. 2 is a rear elevational view of the carriage assembled in the end of the rod.
Fig. 3 is a front elevational view of the carriage assembled in the rod, portions of the rod being broken away.
Figure 6:
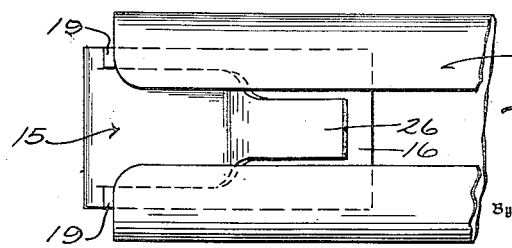
Fig. 6 is a view similar to Fig. 2 showing a slight modification in the structure of the rod.

The traverse rod element 7 shown in Fig. 1 is in the conventional form of a flattened split tube, its terminal marginal portions 8 and 9 being somewhat more flattened than its intermediate marginal portions 10 and 11. Preferably at the precise points at which the more flattened marginal portions 8 and 9 end, the margins are notched at 12. The rod 70 of Fig. 6 is identical with that shown in Figs. 1 to 5 except that it is entirely conventional, the notches at 12 being omitted.

Figures 4, 5:
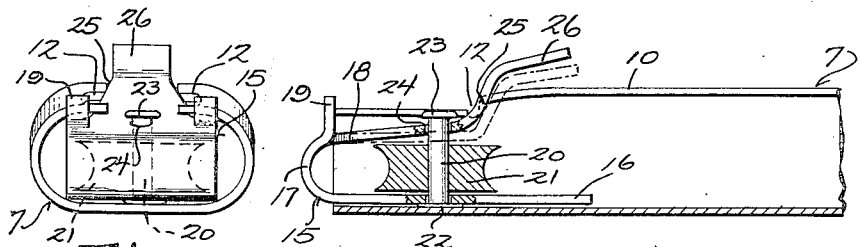
Fig. 4 is an end elevation of the rod and pulley carriage.
Fig. 5 is a view taken in section on the line 5—5 of Fig. 2.

The pulley carriage designated in its entirety by reference character 15 comprises a strap of resilient sheet metal having a relatively broad base portion 16 folded upon itself at 17 and narrowed at 18 to provide a stop for the upturned lugs 19. The metal used is somewhat resilient and, as best shown in Fig. 5, the base portion 16 and the reduced portion 18 are not entirely parallel but are somewhat divergent. Spanning the space between is a bearing post 20 for the pulley 21. The post is provided at its opposite ends with heads 22 and 23 formed by upsetting the ends of the post or otherwise. The post desirably fits snugly in the base portion 16 of the carriage and the head 22 is fixed against the outer face of the base portion. The resilient bias of the material is such that the reduced strap portion 18 tends to spring outwardly respecting post 20 to the limit of movement permitted it by the head 23. The aperture 24 through which post 20 extends is sufficiently larger in diameter than the post to permit the strap member 18 freedom of movement.

Beyond the post 20, the strap member 18 is further reduced in width, its margins converging at the shoulders 25 toward the handle 26, the handle being sufficiently narrow to pass freely between the margins 10 and 11 of the traverse rod.

The proportions of the parts are desirably such that the handle 26 must be pushed toward the base plate 16 to spring the strap 18 inwardly to some extent before the carriage will be received into the end of the traverse rod 15. With the bias of the folded strap overcome by pressure on the handle 26, the carriage may be pushed into the traverse rod and ultimately will reach a position where its lugs 19 will engage the end of the rod, thus precluding further movement. These lugs will, regardless of any other interlocking action, take the thrust to which the pulley carriage may be subject when a traverse cord operates over the pulley 21. However, in the preferred assembly of the parts, the notches 12 in the traverse rod are so positioned that at the precise position of the carriage in which the lugs 19 engage the ends of the rod, the shoulders 25 between the handle 26 and the strap portion 18 of the carriage will enter the notches 12 of the rod, thus positively detaining the carriage in said position. Where, as is sometimes the case, it is not practicable to notch the traverse rod, the resilient bias of strap 18 will nevertheless urge the shoulders 25 against the edges of the split tube comprising the traverse rod, thereby developing a very substantial frictional detent action. This situation is illustrated in Fig. 6, which is identical with Fig. 2 except that the notches 12 are omitted.

In either case, the handle 26 will project slightly at the rear of the rod where it will always be available for manipulation inwardly toward the base plate 16 of the carriage to release all detent action between the carriage and the rod and to permit of the ready withdrawal of the carriage.

Thus the carriage may be engaged and disengaged without tools. Quite apart from the detent actions described, it provides a positive end engagement with the end of the traverse rod to resist all thrust of the traverse cord upon the pulley and, because of the detent feature, it is either positively or impositively restrained against displacement from the position in which its lugs 19 are engaged with the rod in the manner above described.

I claim:

1. A pulley carriage for mounting in the end of a split tubular rod, said carriage comprising a strap of resilient sheet metal having an intermediate fold and opposing strap portions resiliently divergent from each other in a direction away from the fold, the said portions having a width to span the split in the rod in which used, and having a combined thickness at their free ends which exceeds the interior thickness of the split rod in which the carriage is used, a pulley bearing post mounted upon and spanning said portions and free for relative movement respecting one of said portions, and a pulley on the bearing post between said portions, one of said portions having a handle extension divergently spaced from the other said portions by a distance in excess of the spacing of said portions where spanned by the pulley post, said handle extension being sufficiently narrower than said portions to extend through the split in the rod, and detent means carried by the handled portion for expansive engagement with the rod under the divergent resilient bias of said portions, said detent means being released by pressure on the handle against said resilient bias.

2. The carriage of claim 1 in which the detent means comprises shoulders at the junction of the handled portion and the handle.

3. The carriage of claim 1 in which the post is fixed at one of its ends to the strap portion other than that provided with the handle and has a head externally of the strap portion with the handle extension.

4. The combination with a tubular traverse rod having a longitudinal split defined by spaced tube margins, of a pulley carriage detachably mounted in the end thereof, said carriage comprising spaced slide elements having means connecting them at one end of the carriage at a spacing less than the interior thickness of the tube and elsewhere having portions resiliently divergent from said carriage end toward engagement of said slide elements with said tube, one of said elements being provided with detent means expansively engaging said tube and with a handle extension beyond said detent means and projecting through the tube split for manipulation to release said detent.

5. The device of claim 4 in which one of the resiliently divergent carriage elements is provided with a post spanning the space between said elements, the other element having an aperture through which said post projects free of any fixed connection, together with a pulley mounted on the post.

6. The device of claim 4 in which the tubular rod has transversely extending shoulders with which the detent is positively engaged until released by manipulation of the handle.

7. The device of claim 4 in which said detent means comprises shoulders formed on said one element at the junction therewith of said handle and engageable with the tube margins defining said split, said handle being narrower beyond said shoulders for projection through said split.

8. The device of claim 7 in which the tubular rod has notches in said margins with which the detent shoulders of the carriage engage.

9. The device of claim 8 in which the tube margins between said notches and the end of the tube are offset inwardly of the tube margins at the other side of said notches.

10. The device of claim 8 in which the carriage is provided independently of said shoulders with stop means in engagement with the end of the rod whereby to resist displacement of the carriage into the rod irrespective of engagement of said shoulders.

JOHN N. GRABER.

REFERENCES CITED

The following references are of record in the file of this patent:

UNITED STATES PATENTS

| Number | Name | Date |
| --- | --- | --- |
| 1,786,052 | Boye | Dec. 23, 1930 |
| 1,881,627 | Jenkinson | Oct. 11, 1932 |
| 2,486,224 | Stutz | Oct. 25, 1949 |

FOREIGN PATENTS

| Number | Country | Date |
| --- | --- | --- |
| 594,594 | France | June 27, 1925 |